United States Patent [19]

Hulsman et al.

[11] Patent Number: 4,922,746

[45] Date of Patent: May 8, 1990

[54] LEAK TESTING

[75] Inventors: William Hulsman, Falmouth; Ben G. Allen, Cataumet, both of Mass.

[73] Assignee: Benthos, Inc., North Falmouth, Mass.

[21] Appl. No.: 198,753

[22] Filed: May 25, 1988

[51] Int. Cl.$^5$ ............................................. G01M 3/36
[52] U.S. Cl. ........................................ 73/49.3; 73/52
[58] Field of Search ...................... 73/49.3, 52, 40

[56] References Cited

U.S. PATENT DOCUMENTS

| | | |
|---|---|---|
| 1,447,701 | 3/1923 | White . |
| 1,825,699 | 10/1931 | Landrum . |
| 1,974,026 | 9/1934 | Hicks .................................. 73/51 |
| 2,093,429 | 9/1937 | Foss ...................................... 73/51 |
| 2,512,134 | 6/1950 | Baule ................................... 73/37 |
| 2,648,977 | 8/1953 | Mills .................................... 73/52 |
| 2,695,515 | 11/1954 | Ward et al. .......................... 73/37 |
| 3,137,160 | 6/1964 | Mathias ............................... 73/52 |
| 3,371,781 | 3/1968 | Armbruster et al. ........... 209/111.8 |
| 3,416,360 | 12/1968 | Ochs .................................... 73/52 |
| 3,586,165 | 6/1971 | Keinanen .......................... 209/80 |
| 3,751,972 | 8/1973 | Hass ................................. 73/45.4 |
| 3,847,014 | 11/1974 | Mistarz .............................. 73/49.3 |
| 3,880,749 | 4/1975 | Ramsay ............................. 209/80 |
| 3,918,293 | 11/1975 | Feigel ................................ 73/49.3 |
| 3,930,401 | 1/1976 | Filler ................................. 73/49.2 |
| 3,973,249 | 8/1976 | Yokote et al. .................... 340/242 |
| 4,024,956 | 5/1977 | Cassidy .............................. 209/73 |
| 4,117,718 | 10/1978 | Hayward ............................. 73/52 |
| 4,148,213 | 4/1979 | Prakken ............................ 73/45.4 |
| 4,188,819 | 2/1980 | Egee et al. ........................... 73/52 |
| 4,326,408 | 4/1982 | Kanoh ............................... 73/49.3 |
| 4,409,818 | 10/1983 | Wyslotsky et al. ............... 73/49.3 |
| 4,510,730 | 4/1985 | Edmondson .......................... 53/53 |
| 4,649,740 | 3/1987 | Franklin ........................... 73/49.3 |
| 4,697,452 | 10/1987 | Prakken ............................ 73/49.3 |
| 4,715,215 | 12/1987 | Perhach et al. ................... 73/49.3 |
| 4,774,830 | 10/1988 | Hulsman ........................... 73/49.3 |

FOREIGN PATENT DOCUMENTS

| | | |
|---|---|---|
| 209624 | 11/1956 | Australia . |
| 2422526 | 11/1975 | Fed. Rep. of Germany . |
| 2351400 | 1/1978 | France . |
| 57-17833 | 1/1982 | Japan . |
| 137534 | 6/1987 | Japan ................................. 73/49.3 |
| 2059381 | 4/1981 | United Kingdom . |

OTHER PUBLICATIONS

Raymond et al., U.S. Ser. No. 109,928, patent application, filed 10/19/87.

Primary Examiner—Hezron E. Williams
Attorney, Agent, or Firm—Fish & Richardson

[57] ABSTRACT

The leaky or non-leaky condition of a membrane-sealed container is determined by causing motion in one direction of one portion of the membrane; sensing motion in a direction opposite the first direction of another portion of the membrane; and delivering a corresponding signal indicative of the leaky or non-leaky condition.

16 Claims, 5 Drawing Sheets

LEAK TESTING

BACKGROUND OF THE INVENTION

This invention relates to testing membrane-sealed containers for leaks.

A plastic cup containing pudding, for example, may be sealed by a foil laminated flexible membrane that is bonded to the cup along its flange. The pudding typically does not fill the cup and the remaining headspace (between the top surface of the pudding and the underside of the sealing membrane) may contain e.g., air or nitrogen or carbon dioxide. To keep the pudding fresh, the seal must remain intact.

SUMMARY OF THE INVENTION

In a general feature of the invention, the leaky or non-leaky condition of a membrane-sealed container is determined by causing motion in one direction of one portion of the membrane; sensing motion in a direction opposite the first direction of another portion of the membrane; and delivering a corresponding signal indicative of the leaky or non-leaky condition.

Preferred embodiments of the invention include the following features. The first portion of the membrane is moved in a direction toward the inside of the container by a generally ring-shaped contact surface that is pressed against that portion of the membrane. The other portion of the membrane lies within the space bounded by the contact surface and moves into the space defined by a cavity bounded by the contact surface in response to a non-leaking condition. The cavity is closed except for an air passage that permits air to escape when the other portion of the membrane moves into the cavity space. In some embodiments, a detector (e.g. a metal detecting sensor in the case of a metal membrane) is positioned to detect motion within the cavity.

In other embodiments, there is a second contact surface within the cavity, inset relative to the first contact surface, and a duct opens onto the second contact surface; a pressure sensor detects the pressure within the duct to determine when the membrane seals against the second contact surface. A second duct opens onto the second contact surface for supplying pressurized air to apply pressure to the other portion of the membrane; thereafter motion of the other portion of the membrane in the one direction is detected as an indication of a relatively small leak.

Both small and large leaks are determined quickly and accurately. The tester is easily incorporated into any processing line. The device is simple to implement and use. The space around the container need not be pressurized. The tester is adaptable to a variety of containers.

Other advantages and features will become apparent from the following description of the preferred embodiments, and from the claims.

Description of the Preferred Embodiments

We first briefly describe the drawings.

FIGS. 7A, B, and C are charts of pressure versus time for large leak, small leak, and no leak conditions, respectively.

STRUCTURE AND OPERATION

Figure 1:
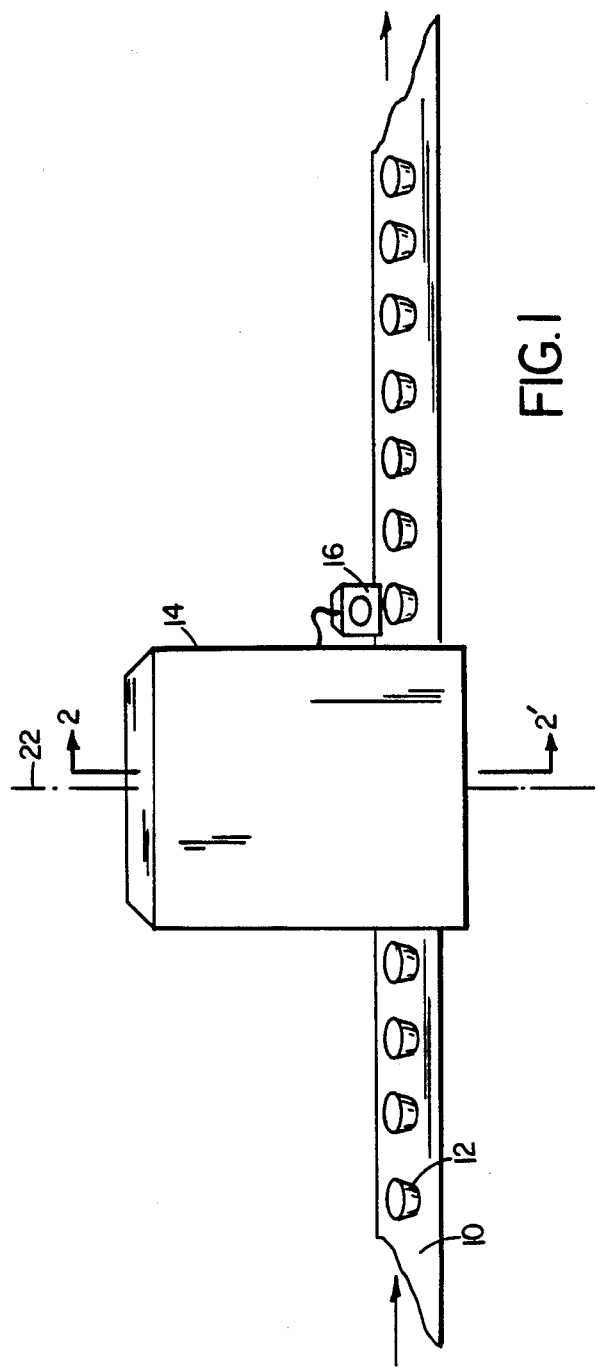
FIG. 1 is a perspective view of apparatus for testing leaks in membrane-sealed cups.

Referring to FIG. 1, a conveyor belt 10 is moved in incremental steps (from left to right) to carry a series of membrane-sealed round plastic cups 12 with potentially defective seals into a leak tester 14 to be tested. A reactor 16 downstream of leak tester 14 is triggered to eject leaky cups from the conveyor.

Figure 2:
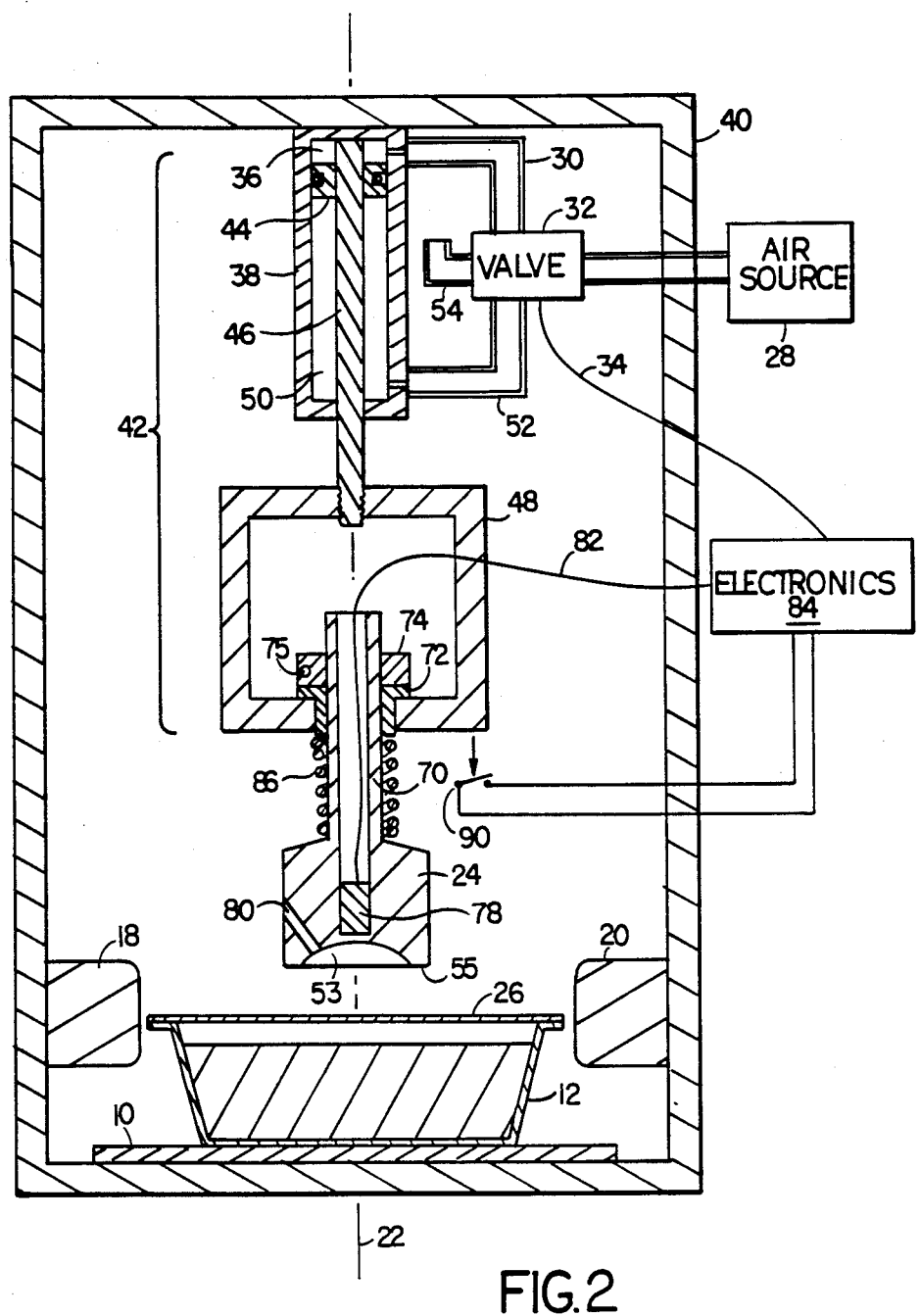
FIG. 2 is a sectional side view of the leak tester at 2—2 of FIG. 1.

Referring to FIG. 2, each cup 12 carried by conveyor belt 10 is guided by rails 18, 20 into a position where (for a given step of the incremental motion of conveyor belt 10), the axis of the cup reaches a temporarily static location where it is aligned with a vertical axis 22 of a cylindrical plastic tester head 24. The tester head 24 is then lowered toward the membrane 26 of the cup 12 by the following mechanism. Compressed air from a source 28 is routed into an upper air tube 30 by a solenoid-operated air valve 32 under control of signals carried on a line 34. The air then enters the upper chamber 36 of an air cylinder 38 (attached to the upper wall of a housing 40) forcing downward a structure 42 that includes a piston 44, a piston rod 46 (mounted on the threaded end of rod 46), a yoke 48, and tester head 24. Air in the lower chamber 50 of cylinder 38 (below piston 44) escapes via a lower air tube 52 and through an exhaust port 54 in the air valve 32 as the piston rod 46 descends. On the up stroke, air valve 32 directs compressed air from the source 28 via the lower air tubing 52 into lower chamber 50, forcing structure 42 upward.

The bottom of tester head 24 has a concave cavity 53 bounded by a ring-shaped contact surface 55.

Figure 3:
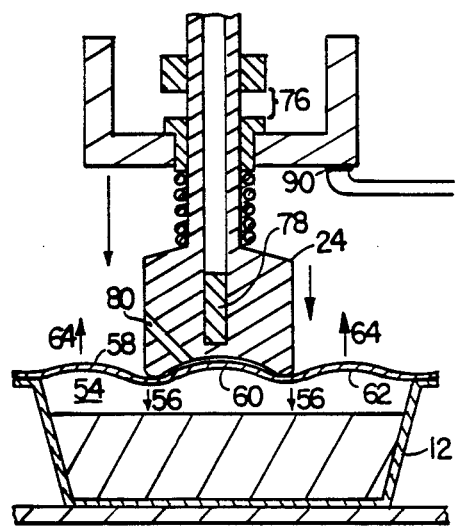
FIGS. 3, 4 are sectional side views of a portion of the leak tester showing the responses of a non-leaking cup and a leaky cup, respectively, during testing.

Referring to FIGS. 2 & 3, tester head 24 is driven downward until contact surface 55 touches the membrane 26 and is then forced against the membrane. This causes the portion of the membrane where contact is made to be moved downward (as indicated by arrows 56). In the case of a substantially non-leaky seal, the headspace gas 54 within the cup becomes compressed, thus causing motion of the other portions 58, 60, 62 upward (as indicated by arrows 64). As structure 24 continues to be driven downward, head shaft 70 slides through a sleeve bearing 72 mounted in the bottom of yoke 48, causing an adjustable collar 74 (held in place by a set screw 75 and originally resting on bearing 72), to separate from bearing 72 by a distance 76, thus compressing cylindrical spring 86 (held between the bottom of yoke 48 and the top of head 24). The force applied by head 24 after it contacts membrane 26 depends on how far spring 86 is compressed. The compressed headspace gas 54 forces the central portion of membrane 26 to bulge into the head cavity 53 thus moving the membrane nearer to a proximity sensor 78, while air in cavity 53 escapes through a vent 80. Proximity sensor 78, mounted in a central hole bored in the tester head at the position just above cavity 53, sends a signal, corresponding to the proximity of membrane 26, via a line 82 to an electronics module 84 (FIGS. 2, 5).

Figure 4:
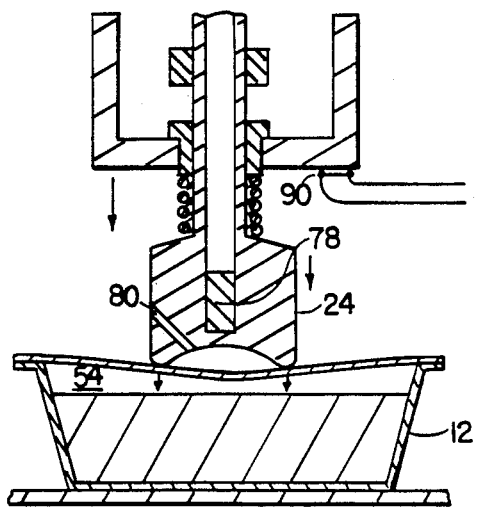

Referring to FIG. 4, if the seal is leaky, the force applied by the tester head causes leakage; the headspace gas 54 approaches one atmosphere of pressure and does not exert an upward pressure on the membrane.

Figure 5:
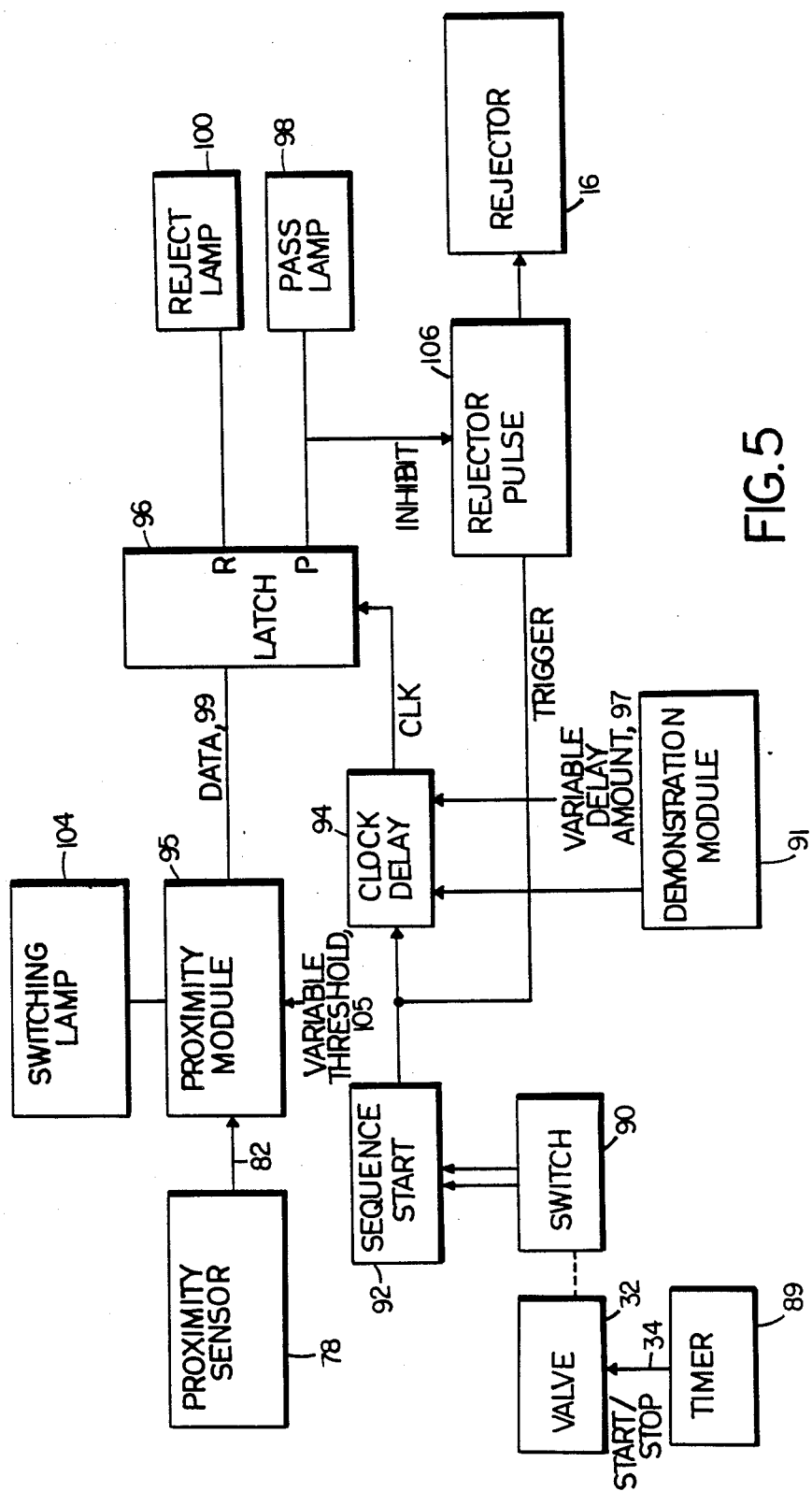
FIG. 5 is a block diagram of electronics for the leak tester.

Referring to FIG. 5, each step in the incremental movement of the conveyor belt brings another cup into coaxial alignment under the tester head. A timer 89 responsive to the stepping of the conveyor then sends a start signal to valve 32 causing yoke 48 to be lowered, closing a switch 90. Collar 74 has been set to a position along head shaft 70 (using set screw 75) to accommodate the height of the cups moving along the conveyor so that yoke 48 turns on switch 90 (FIG. 2) just after head 24 begins to press against membrane 26. After a dwell time of not more than 600 milliseconds (beginning when switch 90 is turned on), yoke 48 is raised, opening the switch 90. This assumes that the yoke is raised before the conveyor belt takes its next incremental step.

During the lowering of the yoke, when switch 90 is first closed, a sequence start module 92 delivers a rising edge signal to a clock delay 94. Clock delay 94 times an adjustable dwell time (based on a prespecified variable delay amount 97) beginning at the rising edge appearing at its input. At the end of the dwell time, clock delay 94 issues a clock pulse that causes a latch 96 to sample the binary value (indicating a good or bad cup) from a proximity module 95. Thus, the dwell time provides a period during which the head is pressed against the membrane and the membrane assumes the configuration of either FIG. 3 or FIG. 4, at which point the cup is determined to be either good or bad. If the cup is good, the P output of latch 96 causes a pass lamp 98 to light; otherwise the R output causes a reject lamp 100 to light. The good/bad decision is made when the dwell time ends. Whatever happens to the container after that time would not normally alter the good/bad decision.

The proximity module 95 receives the proximity sensor signal over a coaxial line 82 and compares it with a variable threshold to determine whether the cup is leaky or not. A switching lamp 104, useful during calibration of a variable threshold 105, is turned on by proximity module 95 when the presence of a lid is detected. At the end of the test, when the test head is raised, switch 90 turns off, which triggers a rejector pulse module 106 to send an activating pulse to rejector 16 (FIG. 1), but only if module 106 is not inhibited by the P output of latch 96 (i.e., when the cup is not leaky).

For demonstration purposes, it is useful to have a scheme in which a good cup can be shown to be good, then (while the test head continues to be pressed against the membrane) be punctured by a pin-hole to trigger the reject lamp. For this purpose, a demonstration module 91 is provided that will enable a "bad" signal that is generated by proximity module 95, after the dwell time would otherwise have passed, to be latched into latch 96. Thus, the demonstration module 97 will fire if the data 99 goes low, causing the latch 96 to clock in the new low value. The reject lamp 100 lights when the clock delay 94 receives a falling edge due to the closing of switch 90 when the head rises off the membrane lid.

Figure 6:
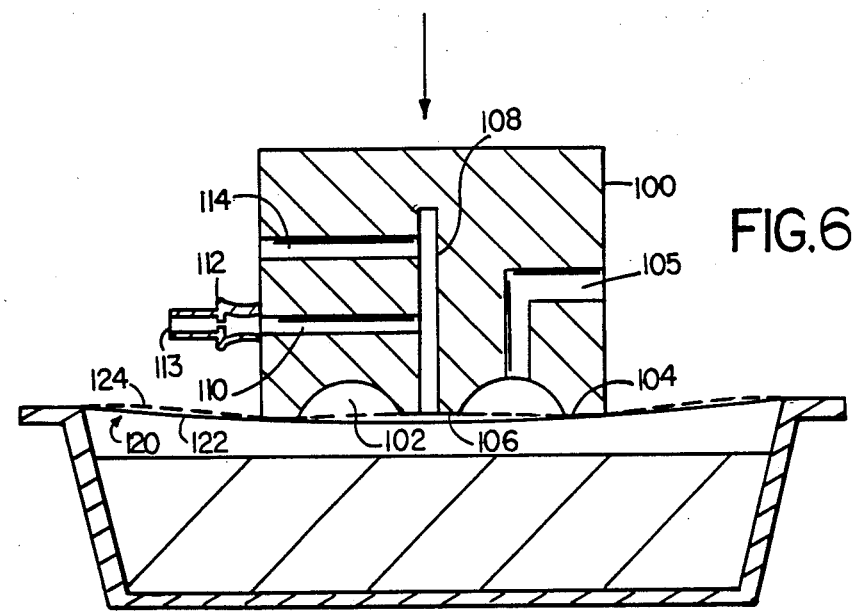
FIG. 6 is a sectional side view of another embodiment.

Referring to FIG. 6, in another embodiment, head 100 has a different configuration, in which a ring-shaped concave cavity 102 is defined between an outer ring-shaped contact surface 104 and a central ring-shaped contact surface 106. Surface 106 is recessed 2 to 5 thousandths of an inch relative to surface 104. Cavity 102 is connected to the ambient atmosphere via a duct 105. A duct 108 opening into the center of surface 106 is connected via a duct 110, an air restrictor 112, and an air inlet 113 to a low pressure source of air (not shown) at 1 to 5 pounds per square inch. Duct 108 is also connected via a duct 114 to an air pressure switch (not shown) for detecting the air pressure in duct 108 over time as an indication of the leaky or nonleaky condition of the container. The air pressure switch is connected to electronics also not shown.

Figure 7:
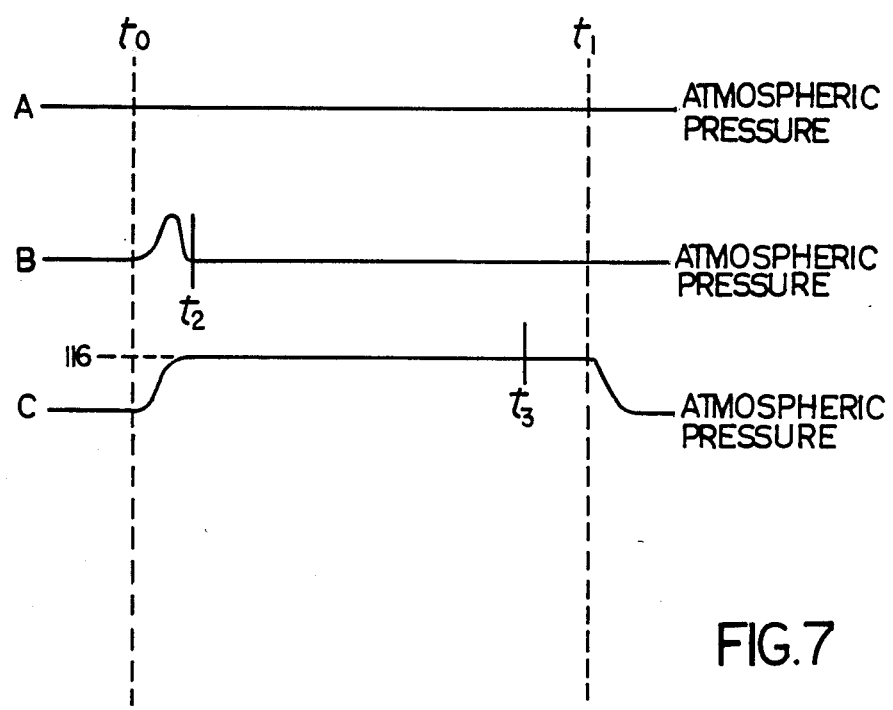

Referring also to FIG. 7 regardless of the state of the container, as head 100 is moved downward and first touches lid 120 at time $t_0$ duct 114 is at atmospheric pressure because duct 108 is open to the ambient atmosphere via cavity 102 and duct 105. Referring to FIG. 7A, if the container has a large leak, the monitored pressure in duct 114 continues to remain at atmospheric pressure (continuing to time $t_1$ when the head is lifted) because the lid quickly conforms to the contour of solid line 122, and duct 108 thus remains open to the atmosphere (via cavity 102 and duct 105).

Referring to FIGS. 7B, 7C, if there is a small leak or no leak, the pressure in duct 114 quickly rises as the lid is forced up to the dotted line contour 124, because duct 108 is closed off, producing an air flow restriction there that is greater than the restriction imposed by restrictor 112. As soon as the pressure rise is detected, downward motion of the head 100 is stopped by the electronics (although the head is allowed to continue to rest on the lid). This enables distinguishing the small leak and no leak cases because, with no leak, the lid continues to seal the surface 106 and pressure at duct 114 continues at elevated level 116 (FIG. 7C) until time $t_1$. By contrast, with a small leak (FIG. 7B), when only a small volume of headspace gas has leaked, the pressurized air delivered via inlet 113 is sufficient to quickly break the seal at surface 106, opening duct 114 to atmosphere (via duct 108, cavity 102, and duct 105), at time $t_2$. Thus by sampling the pressure in duct 114 at time $t_3$, one can distinguish the no leak and small leak conditions without waiting the tens of seconds that would otherwise be required for enough headspace gas to leak out to cause the lid to reach contour 122.

Other embodiments are within the following claims. For example, the proximity sensor could be replaced, e.g., by an LED-photodiode pair or a pneumatic sensor mounted within the test head cavity to detect the motion of a non-foil laminated membrane. A multiple test head tester could be used to test multiple containers simultaneously. Other types of membrane sealed containers could be tested. The tester could be a desk-top unit not fed by a conveyor.

What is claimed is:

1. Apparatus for determining leaky or non-leaky condition of a membrane-sealed container comprising a membrane presser having a ring-shaped surface to press on said membrane and an unobstructed cavity bounded by said ring-shaped surface to accommodate possible unobstructed bulging of the portion of the membrane within said ring-shaped surface in response to said pressing, and a detector for sensing said unobstructed bulging as an indication of said condition.

2. An apparatus for determining leaky or non-leaky condition of a membrane-sealed container, comprising:

a device for contacting one portion of said membrane and for causing motion in one direction of said one portion of said membrane, said motion causing device comprising a contact surface for contacting said one portion of said membrane and a cavity opening into a space bounded by said contact surface, said contact surface is pressed against an exterior surface of said membrane during testing, and said other portion moves into the space defined by said cavity in response to a non-leaking condition; and a detector for sensing resulting motion in a direction opposite said one direction of another portion of said membrane said another portion being spaced apart from said one portion of said membrane, and for delivering a signal indicative of said leaky or non-leaky condition.

3. The device of claim 2 wherein said contact surface is generally ring-shaped.

4. The device of claim 2 wherein said motion causing device causes said motion in a direction toward the inside of said container.

5. The device of claim 2 wherein said other portion of said membrane lies within a space bounded by said contact surface.

6. The device of claim 2, wherein said detector is positioned to detect motion within said cavity.

7. The device of claim 2 wherein said membrane comprises metal and said detector comprises a metal detecting sensor.

8. Apparatus for determining leaky or non-leaky condition of a membrane sealed container, comprising:

a device for causing motion in one direction of one portion of said membrane, said motion causing device having a contact surface for contacting said one portion of said membrane and a cavity opening into a space bounded by said contact surface, said contact surface being pressed against an exterior surface of said membrane during testing, said other portion moving into the space defined by said cavity in response to a non-leaking condition and a second contact surface within said cavity; and a detector for sensing resulting motion in a direction opposite said one direction of another portion of said membrane and for delivering a signal indicative of said leaky or non-leaky condition, said detector comprising a device for detecting when said membrane seals against said second contact surface.

9. The apparatus of claim 8 wherein said detector comprises a duct opening onto said second contact surface, and a pressure sensor for detecting the pressure within said duct.

10. The apparatus of claim 8 wherein said second contact surface is inset relative to the first said contact surface.

11. The apparatus of claim 8 further comprising a duct opening onto said second contact surface for supplying pressurized air.

12. Apparatus for determining leaky or non-leaky condition of a membrane-sealed container, comprising:

a device for causing motion in one direction of one portion of said membrane, and a detector for sensing resulting motion in a direction opposite said one direction of another portion of said membrane and for delivering a signal indicative of said leaky or non-leaky condition, said motion causing device having a contact surface for contacting said one portion of said membrane, and a cavity opening into the space bounded by said contact surface, said contact surface being pressed against the exterior surface of said membrane during testing, said other portion moving into the space defined by said cavity in response to a non-leaking condition, said cavity being closed except for an air passage that permits air to escape when said other portion moves into the cavity space.

13. The device of claim 12 comprising a second contact surface within said cavity, and wherein said detector comprises a device for detecting when said membrane seals against said second contact surface.

14. The apparatus of claim 13 wherein said detector comprises a duct opening onto said second contact surface, and a pressure sensor for detecting the pressure within said duct.

15. The apparatus of claim 13 wherein said second contact surface is inset relative to the first said contact surface.

16. The apparatus of claim 13 further comprising a duct opening onto said second contact surface for supplying pressurized air.

* * * * *